United States Patent

Yang et al.

(10) Patent No.: US 7,052,630 B2
(45) Date of Patent: May 30, 2006

(54) RESIN ADDITIVE COMPOSITION AND PROCESS FOR PRODUCING THE SAME

(75) Inventors: Wu Yang, Aichi (JP); Hajime Kambara, Tokyo (JP); Mika Osawa, Hiroshima (JP); Yoko Ueno, Kyoto (JP); Masayuki Okoshi, Kyoto (JP)

(73) Assignee: Ajinomoto Co., Inc., Tokyo (JP)

( * ) Notice: Subject to any disclaimer, the term of this patent is extended or adjusted under 35 U.S.C. 154(b) by 621 days.

(21) Appl. No.: 10/168,970

(22) PCT Filed: Dec. 5, 2000

(86) PCT No.: PCT/JP00/08599

§ 371 (c)(1),
(2), (4) Date: Oct. 15, 2002

(87) PCT Pub. No.: WO01/48072

PCT Pub. Date: Jul. 5, 2001

(65) Prior Publication Data

US 2003/0057406 A1    Mar. 27, 2003

(30) Foreign Application Priority Data

Dec. 27, 1999  (JP) .................... 11/370178

(51) Int. Cl.
C09K 21/02 (2006.01)
C09K 21/04 (2006.01)
C09K 21/14 (2006.01)
C09K 15/00 (2006.01)
C08K 3/00 (2006.01)

(52) U.S. Cl. ............ 252/609; 252/363.5; 252/400.1; 252/400.4; 252/400.5; 252/400.53; 252/400.54; 252/401; 252/182.29; 524/401; 524/417; 524/428; 524/430

(58) Field of Classification Search ........... 252/609
See application file for complete search history.

(56) References Cited

U.S. PATENT DOCUMENTS 4,556,700 A * 12/1985 Harris et al. ............ 526/209
4,622,414 A * 11/1986 McKervey ............... 560/61
4,695,615 A * 9/1987 Leonard et al. ........... 526/194
4,933,407 A * 6/1990 Harris et al. ............ 526/208
5,424,343 A * 6/1995 Attarwala ............... 524/83
6,093,780 A * 7/2000 Attarwala ............... 526/298
6,753,363 B1 * 6/2004 Harashina ............... 524/99

FOREIGN PATENT DOCUMENTS

| JP | 2-133412 | 5/1990 |
| JP | 3-249941 | 11/1991 |
| JP | 10-203906 | 8/1998 |
| WO | 9629363 | 9/1996 |

* cited by examiner

Primary Examiner—Joseph D. Anthony
(74) Attorney, Agent, or Firm—Oblon, Spivak, McClelland, Maier & Neustadt, P.C.

(57) ABSTRACT

In this application is disclosed a resin additive composition which can by produced by precipitating a calix(n+m+l)arene represented by the following general formula (2) and in a dissolved state together with or at the same time at least one functional ingredient selected from the group consisting of various water-soluble or hydrophilic resin flam-retardants, resin thermal stabilizers and resin curing agents, and in a dissolved or suspended state.

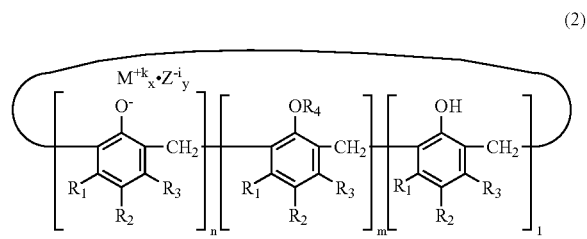

(2)

This resin additive composition has a good affinity for organic polymers such as polyolefin and the like, which allows the functional ingredient(s) to be dispersed homogeneously in the resin. Therefore are provided high-performance resin compositions comprising various functional ingredient(s).

19 Claims, No Drawings

RESIN ADDITIVE COMPOSITION AND PROCESS FOR PRODUCING THE SAME

CROSS REFERENCES TO RELATED APPLICATIONS

This application is a 371 of International Patent Application No. PCT/JP00/08599, filed on Dec. 5, 2000, and claims priority to Japanese Patent Application No. 11/370178, filed on Dec. 27, 1999.

TECHNICAL FIELD

The present invention relates to a novel resin additive composition, and a process for producing the same. Also, the present invention relates to a resin composition blended with the resin additive composition, and a thermally plasticized product or thermally cured product thereof.

BACKGROUND ART

Recently, green polymers including polyolefins as the representative have become very important as the severity of global environmental problems increases. In order to expand the application range of polyolefins, it is actively studied to improve the physical properties of polyolefins per se.

On the other hand, the improvement of performance of polyolefins by incorporating a functional ingredient into the polyolefins is a potent means for expanding their application range and therefore has attracted attention from every side. However, since polyolefins are hydrophobic, various water-soluble or hydrophilic functional ingredients exhibit a poor affinity to polyolefins as they are, so that it is difficult to disperse such ingredients in such polymers. Therefore, Japanese Patent Application Laid-Open (Kokai) No. 203906/1998, for example, discloses an antibacterial agent wherein an antibacterial metal ions are included in and supported by a calixarene, and also describes that the antibacterial agent exhibits a good affinity to organic polymers. Moreover, although it is not aimed at to disperse in a polymer, Japanese Patent Application Laid-Open (Kokai) No. 249941/1991 discloses a deodorant composition wherein a divalent metal salt is included in a calixarene.

DISCLOSURE OF THE INVENTION

It is an object of the present invention to provide a resin additive composition comprising a functional ingredient such as various, water-soluble or hydrophilic flame retardants, and a process for producing the same. It is another object of the present invention to provide a resin composition blended with the above resin additive composition, and a thermally plasticized product or thermally cured product thereof.

As a result of the extensive studies, the present inventors have found that a functional resin additive composition excellent in an affinity to organic polymers (herein, sometimes referred to simply as "resins") including green polymers can be obtained by dispersing homogeneously a functional ingredient such as a flame retardant or the like in the solid of a calixarene, and also various functions can be imparted to organic polymers by such resin additive composition being allowed to be included in organic polymers. Based on these findings, they have accomplished the present invention.

Accordingly, a first embodiment of the present invention relates to a resin additive composition comprising a calix(n+m+l)arene represented by the following general formula (1) and a functional ingredient dispersed homogeneously in the solid of the calix(n+m+l)arene.

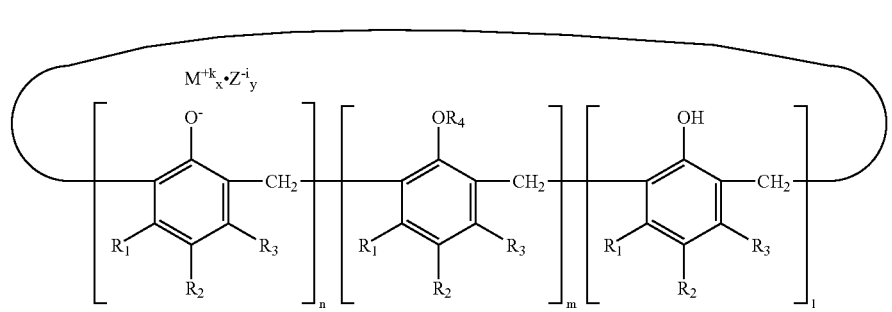

(1)

wherein $R_1$, $R_2$ and $R_3$ represent each independently a hydrogen atom, a saturated or unsaturated alkyl group which may have substituent(s), an aryl group which may have substituent(s), an alkoxyl group which may have substituent(s), a halogen atom, a nitro group, an acyl group, a carboxyl group, a sulfonic acid group or an amino group which may have substituent(s), $R_4$ represents a saturated or unsaturated alkyl group which may have substituent(s), an aryl group which may have substituent(s) or an acyl group, and n represents an integer of 0 to 10, m represents an integer of 0 to 10, l represents an integer of 0 to 10, and n+m+l represents an integer of 4 to 10. $R_1$, $R_2$ and $R_3$ may be different from each other depending on each unit of n, m and l. $M^{+k}$ represents a metal ion, an $NH_4^+$ ion or an organic cation, +k represents the valence number of the ion, and k represents an integer of 1 to 6. $Z^{-i}$ represents an anion, −i represents the valence number of the anion, and i represents an integer of 1 to 6. x represents an integer of 0 to 10 and y represents an integer of 0 to 10, which satisfy x×k=i×y+n.

According to the present invention, calix(n+m+l)arenes are preferably those compounds wherein $M^{+k}$ represents an alkali metal ion, an $NH_4^+$ ion or an organic ammonium, that is, k represents 1, in the above general formula (1).

According to the present invention, calix(n+m+l)arenes are preferably those compounds wherein, in the general formula (1), m is 0, and n+m+l represents 4, 6 or 8, and $R_1$ and $R_3$ represent each a hydrogen atom and $R_2$ represents a saturated or unsaturated alkyl group which may have substituent(s) or an aryl group which may have substituent(s).

Moreover, according to the present invention, calix(n+m+l)arenes are preferably those compounds wherein, in the general formula (1), m is an integer of 1 or more, and n+m+l represents 4, 6 or 8, and $R_1$ and $R_3$ represent each a hydrogen atom and $R_2$ represents a saturated or unsaturated alkyl group which may have substituent(s) or an aryl group which may have substituent(s).

The functional ingredient to prepare a functional resin additive composition by being dispersed homogeneously in the solid of the calixarene described as above is a resin flame retardant, a resin thermal stabilizer, and a resin curing agent.

Furthermore, a second embodiment of the present invention relates to a process for producing the above functional resin additive composition. Briefly, the process comprises a step of precipitating a calixarene in a dissolved state together with a functional ingredient in a dissolved or suspended state, for example, in the form where the functional ingredient is held between the molecules of the calixarene.

Specifically, it relates to a process for production wherein a solution or suspension of a functional ingredient such as a flame retardant or the like in a solvent containing water and/or an alcohol or a solvent capable of mixing with them is blended with a solution of a calix(n+m+l)arene represented by the following general formula (2) in a solvent containing an alcohol, whereby a precipitate is formed, and the resulting solid matter (precipitate) is separated from the liquid by filtration or the like.

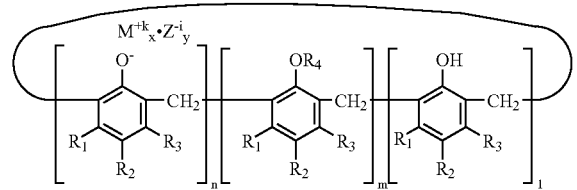

(2)

wherein $R_1$, $R_2$ and $R_3$ represent each independently a hydrogen atom, a saturated or unsaturated alkyl group which may have substituent(s), an aryl group which may have substituent(s), an alkoxyl group which may have substituent(s), a halogen atom, a nitro group, an acyl group, a carboxyl group, a sulfonic acid group or an amino group which may have substituent(s), $R_4$ represents a saturated or unsaturated alkyl group which may have substituent(s), an aryl group which may have substituent(s) or an acyl group, and n represents an integer of 1 to 10, m represents an integer of 0 to 10, l represents an integer of 0 to 10, and n+m+l represents an integer of 4 to 10. $R_1$, $R_2$ and $R_3$ may be different from each other depending on each unit of n, m and l. $M^{+k}$ represents a metal ion, an $NH_4^+$ ion or an organic cation, +k represents the valence number of the ion, and k represents an integer of 1 to 6. $Z^{-i}$ represents an anion, –i represents the valence number of the anion, and i represents an integer of 1 to 6. x represents an integer of 1 to 10 and y represents an integer of 0 to 10, which satisfy $x \times k = i \times y + n$.

By the way, the difference between the both formulae of the above general formula (1) and the general formula (2) lies in each range of n and x in the both formulae. That is, the difference is whether the formulae include the case of n=0 or x=0, or not. The reason why such a difference arises because the general formula (1) represents the calixarene in the produced resin additive composition of the present invention, but the general formula (2) represents the calixarene solubilized in a solvent upon the production of the resin additive composition of the present invention.

In greater detail, upon the production of the resin additive composition of the present invention, the calixarene represented by the above general formula (2) should be solubilized in a solvent, wherein n is necessarily 1 or more, i.e., phenol group(s) have become phenoxy ion(s) by a base, and also x is 1 or more, i.e., counter ion(s) (M in the general formula (2)) are present. Thereafter, in the operation, the calixarene is precipitated together with the functional ingredient. On the other hand, upon the production of the resin additive composition, in the case that neutralization with an acid is carried out, the phenoxy ion(s) revert to the phenol form and thus there is a possibility that the counter ion(s) are not necessary, so that there is the case of x=0 or n=0. Therefore, in that case, the calixarene is present in the produced resin additive composition in such a form, that is, the form of n=0 or x=0 which is represented by the general formula (1).

Furthermore, a third embodiment of the present invention relates to a resin composition blended with the above resin additive composition, and a thermally plasticized product or thermally cured product of such a resin composition.

In the following will be described the present invention in detail.

In the resin additive composition containing the functional ingredient relating to the first embodiment of the present invention, a functional ingredient such as a flame retardant or the like is contained by homogeneously dispersed in the solid of a calix(n+m+l)arene represented by the above general formula (1).

In the above general formula (1), as has been described previously, $R_1$, $R_2$ and $R_3$ represent each independently a hydrogen atom, a saturated or unsaturated alkyl group which may have substituent(s), an aryl group which may have substituent(s), an alkoxyl group which may have substituent(s), a halogen atom, a nitro group, an acyl group, a carboxyl group, a sulfonic acid group or an amino group which may have substituent(s).

As such a saturated or unsaturated alkyl group which may have substituent(s), there may be mentioned, e.g., methyl, ethyl, propyl, isopropyl, butyl, iso-butyl, sec-buthyl, tert-butyl, pentyl, hexyl, 2-ethylhexyl, octyl, or tert-octyl group, or the like. Out of these, lower alkyl groups having at most about 10 carbon atoms such as isopropyl, or tert-butyl group, and the like, are preferred. Also, allyl, 1-propenyl and the like groups may be mentioned.

There may be also mentioned a carboxyl-substituted alkyl group such as carboxymethyl, carboxyethyl, carboxypropyl, carboxylbutyl or the like; a alkoxycarbonyl alkyl group such as methoxycarbonylmethyl, ethoxycarbonylmethyl or the like; a hydroxyl-substituted alkyl group such as hydroxymethyl, hydroxyethyl, hydroxypropyl, hydroxybutyl or the like; a sulfonic acid alkyl group such as sulfomethyl, sulfoethyl, sulfopropyl, sulfobutyl or the like; an amino-substituted alkyl group such as aminomethyl, aminoethyl, aminopropyl, aminobutyl or the like; an aryl-substituted alkyl group such as phenethyl or the like, or the like.

As such an aryl group which may have substituent(s), there may be mentioned, e.g., phenyl, tolyl, xylyl, cumenyl, 4-biphenylyl or the like. Out of these, phenyl is preferred. As such an alkoxyl group which may have substituent(s), e.g., methoxyl, ethoxyl, propoxyl, butoxyl, methoxyethoxyl or the like. As such a halogen atom, there may be mentioned fluorine, chlorine or bromine atom. As such an acyl group, there may be mentioned acetyl, propionyl, benzoyl or the like. As such an amino group which may have substituent(s), there may be mentioned amino, methylamino, ethylamino, dimethylamino, diethylamino, or the like.

Also, as has been described above, $R_1$, $R_2$ and $R_3$ may be different from each other depending on each unit of n, m and l. $R_4$, as has been described above, represents a saturated or unsaturated alkyl group which may have substituent(s), an aryl group which may have substituent(s) or an acyl group. Specific examples thereof may be the same as those which have been described above, in connection with $R_1$, $R_2$ and $R_3$.

Further, as has been described previously, n represents an integer of 0 to 10, m represents an integer of 0 to 10, l represents an integer of 0 to 10, and n+m+l represents an integer of 4 to 10.

As has been described above, $M^{+k}$ represents a metal ion, an $NH_4^+$ ion or an organic cation, +k represents the valence number of the ion, and k represents an integer of 1 to 6. As the metal of such a metal ion represented by $M^{+k}$, there may be mentioned, e.g., Li, K, Na, Ca, Al, Cu, Ti, Cr, Fe, Mg, Co, Ga, Pb, Mn, Mo, Ni, Zn, Zr or the like. And, as an organic cation represented by $M^{+k}$, there may be mentioned, e.g., a primary ammonium, a secondary ammonium, a tertiary ammonium, a quarternary ammonium, or the like. As the specific examples, there may be mentioned $C_4H_9NH_3^+$, $(C_2H_5)_2NH_2^+$, $(C_2H_5)_3NH^+$, $(C_2H_5)_4N^+$, $^+NH_3CH_2CH_2NH_3^+$, pyrodinium, and the like. Out of these, an alkali metal ion or $NH_4^+$ ion represented by $M^{+k}$ where k=1, is preferred, since the inventive resin additive composition can be easily obtained therefrom.

As has been described above, $Z^{-i}$ represents an anion, –i represents the valence number of the anion, and i represents an integer of 1 to 6. i represents preferably an integer of 1 to 3. As such an anion, there may be mentioned, e.g., $Cl^-$, $Br^-$, $I^-$, $SO_4^{2-}$, $NO_3^-$, $ClO_3^-$, $OH^-$, $OCOCH_3^-$, $CO_3^{2-}$, $CN^-$, $BF_4^-$, $HCO_3^-$, $H_2PO_4^-$, $HPO_4^{2-}$, $PO_4^{3-}$, $CNS^-$, $IO_3^-$, $SH^-$, $C_2O_4^{2-}$, $ClO_4^-$, or the like. Out of these is preferred $Cl^-$, $Br^-$, $OCOCH_3^-$, $BF_4^-$, $H_2PO_4^-$, $HPO_4^{2-}$, $PO_4^{3-}$ or the like.

And, x represents an integer of 0 to 10 an y represents an integer of 0 to 10, which satisfy x×k=i×y+n, as has already been described.

According to the present invention, out of calix(n+m+l) arenes represented by the general formula (1) are preferred those compounds of the general formula wherein m is 0, and n+m+l represents 4, 6 or 8, and $R_1$ and $R_3$ represent each a hydrogen atom and $R_2$ represents a saturated or unsaturated alkyl group which may have substituent(s) or an aryl group which may have substituent(s), as has been described previously. Out of these calixarenes are more preferred those of the general formula wherein $R_2$ represents, e.g., a lower alkyl group such as isopropyl, n-pentyl, n-octyl, tert-butyl or the like, or phenyl.

Moreover, according to the present invention, out of calix(n+m+l)arenes represented by the general formula (1) are preferred those compounds of the general formula wherein m is an integer of 1 or more, and n+m+l represents 4, 6 or 8, and $R_1$ and $R_3$ represent each a hydrogen atom and $R_2$ represents a saturated or unsaturated alkyl group which may have substituent(s) or an aryl group which may have substituent(s), as has been already described. Out of these calixarenes are more preferred those of the general formula wherein $R_2$ represents, e.g., isopropyl, n-pentyl, n-octyl, tert-butyl or the like, or phenyl, and $R_4$ represents, e.g., a lower alkyl group such as n-propyl, n-butyl or the like, or acetyl or phenyl group.

According to the present invention, the above-mentioned three kinds of functional ingredients, i.e., resin flame retardant, resin thermal stabilizer and resin curing agent, are appropriately selected depending on the purpose, and dispersed in the solid of a calixarene. It has been, hitherto, difficult to disperse a water-soluble or hydrophilic functional ingredient in organic polymers such as polyolefins or the like. However, the functional resin additive composition of the present invention can be dispersed in organic polymers, and as a result, various functions can be imparted to such organic polymers.

Moreover, it is possible for two or more kinds of functional ingredients to be included or incorporated in the resin additive composition of the present invention. By incorporating two or more kinds of functional ingredients, a synergistic effect can be attained, which results in an additive composition of high performance.

Since various known functional ingredients can be employed as the three kinds of functional ingredients according to the present invention, in the following will be illustrated only representative ones. That is, the following are examples of the functional ingredients, and the functional ingredients according to the present invention are not limited thereto.

First, examples of the resin flame retardant as the functional ingredient include various boric acid-type flame-retarding compounds, phosphorus-type flame-retarding compounds, nitrogen-type flame-retarding compounds, halogen-type flame-retarding compounds, organic flame-retarding compounds, colloidal flame-retarding compounds and the like.

As such boric acid-type flame-retarding compounds, there may be mentioned, e.g., boric acid-containing compounds such as boric acid, sodium borate, potassium borate, zinc borate hydrate, barium metaborate and borax, and the like.

As such phosphorus-type flame retarding compounds, there may be mentioned, e.g., phosphorus-containing compounds such as phosphoric acid, polyphosphoric acid, sodium phosphate, potassium phosphate, sodium polyphosphate, potassium polyphosphate, ammonium phosphate, ammonium polyphosphate, melamine phosphate, red phosphorus, phosphate esters, tris(chloroethyl)phosphate, tris(monochloropropyl)phosphate, tris(dichloropropyl)phosphate, triallyl phosphate, tris(3-hydroxypropyl)phosphate, tris(tribromophenyl)phosphate, tris•β-chloropropyl phosphate, tris(dibromophenyl)phosphate, tris(tribromoneopentyl)phosphate, tetraxis(2-chloroethyl)ethylene•diphosphate, dimethylmethyl phosphate, tris(2-chloroethyl)orthophosphate, aromatic group-condensed organic phosphate esters, halogen-containing condensed organic phosphate esters, ethylene•bis•tris(2-cyanoethyl)phosphonium bromide, ammonium polyphosphate, β-chloroethyl acid phosphate, butyl pyrophosphate, butyl acid phosphate, butoxyethyl acid phosphate, 2-ethylhexyl acid phosphate, melamine phosphate salt, halogen-containing phosphates, phenylphosphonic acid, and the like.

As other inorganic flame retarding compounds, there may be mentioned, e.g., halogen-type inorganic salts such as sodium bromide, potassium bromide, ammonium bromide, ammonium chloride, potassium chloride, sodium iodide, potassium iodide, ammonium iodide and the like; metal sulfate compounds such as zinc sulfate, potassium hydrogen sulfate, aluminum sulfate, antimony sulfate, sulfate esters, potassium sulfate, cobalt sulfate, sodium hydrogen sulfate, iron sulfate, copper sulfate, sodium sulfate, nickel sulfate, barium sulfate, magnesium sulfate and the like; ammonium-type flame retarding compounds such as ammonium sulfate and the like; iron oxide-type smoke-reducing agents such as ferrocene and the like; metal nitrate compounds such as copper nitrate and the like; titanium-containing compounds such as titanium oxide and the like; guanidine-type compounds such as guanidine sulfamate and the like; and in addition, zirconium compounds, molybdenum compounds, tin compounds, carbonate salt compounds such as potassium carbonate and the like, metal hydroxides such as aluminum hydroxide, magnesium hydroxide and the like and modified compounds thereof; and the like.

As such nitrogen-type flame retarding compounds, there may be mentioned, e.g., melamine compounds such as melamine, melamine sulfate, melamine phosphate and the like; amines such as triethylamine, ethylenediamine, imidazole and the like, and phosphates or sulfates thereof; triazine ring-containing cyanurate compounds; and the like.

As such halogen-type flame retarding compounds, there may be mentioned, e.g., halogen-containing flame-retarding compounds such as chlorinated paraffins, perchlorocyclopentadecane, hexabromobenzene, decabromodiphenyl oxide, bis(tribromophenoxy)ethane, ethylene bis dibromonorbornanedicarboximide, ethylene bis•tetrabromophthalimide, dibromoethyl•dibromocyclohexane, dibromoneopentyl glycol, 2,4,6-tribromophenol, tribromophenyl allyl ether, tetrabromo•bisphenol A derivatives, tetrabromo•bisphenol S derivatives, tetradecabromo•diphenoxybenzene, tris-(2,3-dibromopropyl)isocyanurate, 2,2-bis(4-hydroxy-3,5-dibromophenyl)propane, 2,2-bis(4-hydroxyethoxy-3,5-dibromophenyl)propane, poly(pentabromobenzyl acrylate), tribromostyrene, tribromophenylmaleimide, tribromoneopentyl alcohol, tetrabromodipentaerythritol, pentabromobenzyl acrylate, pentabromophenol, pentabromotoluene, pentabromodiphenyl oxide, hexabromocyclododecane, hexabromodiphenyl ether, octabromophenol ether, octadibromodiphenyl ether, octabromodiphenyl oxide, dibromoneopentyl glycol tetracarbonate, bis(tribromophenyl)fumaramide, N-methylhexabromodiphenylamine, bromostyrene, diallyl chlorendate, and the like.

As other organic flame-retarding compounds, there may be mentioned, e.g., organic sulfonic acid metal salts such as potassium trichlorobenzenesulfonate, potassium diphenylsulfone-3-sulfonate, potassium perfluorobutanesulfonate, and the like, chlorendic anhydride, phthalic anhydride, bisphenol A-containing compounds, glycidyl compounds such as glycidyl ether and the like, polyhydric alcohols such as diethylene glycol, pentaerythritol and the like, modified carbamides, silicone compounds such as silicone oils, organosiloxanes and the like, and the like.

As such colloidal flame-retarding compounds, there may be mentioned, e.g., colloids of hitherto used flame-retarding compounds including metal hydrate compounds such as aluminum hydroxide, magnesium hydroxide, calcium hydroxide and the like, calcium aluminate, gypsum dihydrate, zinc borate, barium metaborate, borax, hydrates such as kaolin clay and the like, nitrate compounds such as sodium nitrate and the like, molybdenum compounds, zirconium compounds, antimony compounds, dawsonite, phlogopite and the like.

Next, as such resin thermal stabilizers, there may be mentioned, e.g., the following. That is, as organic compounds, metal salts of fatty acids (metal soaps) such as zinc stearate, calcium stearate, barium stearate and the like; polyol compounds such as pentaerythritol, dipentaerythritol, 1,3-butanediol, sorbitol and the like; epoxy compounds such as epoxidized soybean oil, dioctyl epoxyhexahydrophthalate and the like; β-diketones such as dibenzoylmethane, stearoylbenzoylmethane and the like, phosphite compounds such as triphenylphosphite and the like; and the like.

Finally, as such resin curing agents, there may be mentioned e.g., triethylamine, diethylenetriamine, triethylenetetramine, tetraethylenepentamine, modified hexamethylenediamine, N-aminoethylpiperazine, dipropylenetriamine, 3,3-dimethyl-4,4'-diaminodicyclohexylmethane, 3-amino-1-cyclohexylaminopropane, heterocyclic diamines, aliphatic amine•adducts, ketimines, modified polyamines, aliphatic polyamines such as aliphatic polyether polyamines, polyoxypropyleneamine and the like, polyamide, modified polyamide•amines such as polyamine•adducts and the like, aromatic polyamines such as m-phenylenediamine, p,p'-diaminodiphenylmethane, p,p'-diaminodiphenylsulfone, metaxylenediamine, 1,3-bis(aminomethyl)cyclohexane and the like, dicyandiamide, phenolderivatives such as 2-dimethylaminophenol and the like, spiroacetal diamine, polyoxyethylenediamine, spiroguanamine, polyglycolamine, tertiary amines, boron trifluoride-type complex salts such as boron trifluoride-monoethylamine complex salt and the like, imidazole compounds, phthalic anhydrides such as tetrahydrophthalic anhydride and the like, maleic anhydride, trimellitic anhydride, krendic anhydride, succinic acid-type compounds such as alkenylsuccinic anhydride and the like, thiourea derivatives, octyltin(I), mercaptane compounds, hydrazide compounds, organic tin compounds such as dibutyltin diacetate and the like, and the like.

The content of the functional ingredient(s) such as a flame retardant in the calix(n+m+1)arene of the above general formula (1) is not particularly limited since it depends on the purpose of the resin additive composition. However, the functional ingredient(s) may be suitably used in an amount of about 0.1 to 1,000 parts by weight relative to 100 parts by weight of the calix(n+m+1)arene.

According to the present invention, the size of the functional ingredient(s) dispersed homogeneously in the solid of an calix(n+m+1)arene is preferably smaller than 1 μm.

According to the present invention, as the state of functional ingredient(s), there may be mentioned such form that the functional ingredient(s) are held between the molecules of the calix(n+m+1)arene. The form can be confirmed by X-ray diffraction with regard to whether it is in a coarse crystalline state or in an amorphous state having fine structure, by means of an electron microscope with regard to the shape, by EPMA with regard to the microscopic distribution of the elements, and the like. By the way, a mere mixture of the functional ingredient(s) and the calixarene cannot exhibit the effects of the present invention. This is because mere mechanical pulverization of such a mixture does not afford fine particles of submicron order, and the dispersing ability in the resin can not be improved, which is, in turn, because of no increase in hydrophobicity which may caused by the functional ingredient molecules being included by the calixarene and by the calixarene being adsorbed onto the fine particle surfaces of the functional ingredient(s).

Next, in the following will be described the process for producing the functional resin additive composition of the present invention.

Briefly, the process for production comprises, as has been described previously, a step of precipitating a calixarene in a dissolved state together with or at the same time functional ingredient(s) in a dissolved or suspended state.

Specifically, for example, a solution or suspension (Y) of a functional ingredient in a solvent containing water and/or an alcohol or a solvent capable of mixing therewith is mixed with a solution (X) of a calix(n+m+l)arene represented by the above general formula (2) in a solvent containing an alcohol, whereby a precipitate is caused to be formed.

The solution (X) can be obtained, as a solution of the corresponding calix(n+m+1)arene of the general formula (2) wherein n is from 1 to 10, for example, by suspending a calix(n+m+1)arene of the above general formula (2) wherein n is 0 in a solvent containing an alcohol, followed by adding a base thereto.

As such an alcohol, there may be used, e.g., methanol, ethanol, propanol, or the like. By "the solvent containing an alcohol" is meant a solvent composed mainly of an alcohol and capable of dissolving the calix(n+m+1)arene when added with a base. Usually, as the solvent per se, a solvent composed solely of an alcohol may be suitably used.

As such a base, use may be made of, e.g., an alkali metal hydroxide such as KOH, NaOH or the like, ammonia water, an organic amine such as triethylamine, diethylamine, ethylenediamine, $(C_2H_5)_4N^+OH^-$, or the like, or the like. Out of these are preferred KOH and NaOH because of their inexpensive cost and easy handling.

The solution or suspension (Y) of a functional ingredient may be obtained by dissolving or suspending a functional ingredient in a solvent containing water and/or an alcohol or a solvent capable of mixing therewith depending on the nature of the functional ingredient. From the viewpoint of homogeneous dispersion of the functional ingredient in the calix(n+m+1)arene, the functional ingredient is preferably in a dissolved state.

As such an alcohol, there may be used, e.g., methanol, ethanol, propanol, or the like. As such a solvent capable of mixing with water and/or an alcohol, use may be made of, e.g., benzene, toluene, xylene, ethyl acetate, THF, DMSO, DMF, ketone-type solvent (acetone, methyl ethyl ketone, diethyl ketone, allyl ethyl ketone, or the like), or the like.

The mixing of the solution or suspension (Y) with the solution (X) may be conducted by merely mixing the two. However, in the case where the functional ingredient has been dissolved in water, mixing of the two immediately results in precipitation, and therefore it is preferable to add dropwise the solution (X) into the solution (Y). Thereby, homogeneous dispersion of the functional ingredient in the calix(n+m+1)arene can be attained.

In the case where mere mixing of the solution or suspension (Y) with the solution (X) does not form a precipitate, an operation for causing a precipitate to be formed is conducted.

With regard to such an operation, a precipitate can be formed by neutralizing the mixed solution with an acid, for example. Moreover, a precipitate can be also formed by adding an organic poor solvent for the precipitate, which solvent is miscible with water and/or an alcohol, to the mixed solution. As such an organic poor solvent, benzene, toluene, xylene, diethyl ether or the like may be used, for example. Alternatively, there is a case where water is suitably added instead of the organic poor solvent. Furthermore, a precipitate can be also formed by evaporating the solvent of the mixed solution. These operations for precipitation may be suitably selected.

Next, the resulting precipitate(solid matter) is separated by filtration, centrifugation or the like, and then usually subjected to drying successively. After the obtaining of the precipitate and before the separation thereof by filtration, or the like, the alkali adhering to the precipitate may be neutralized with an acid, if necessary. Also, after the separation by filtration or the like, the solid matter is washed, if necessary. Drying may be conducted under suitable conditions and, for example, drying can be achieved by heat-drying at about 30 to 400° C. for 0.5 to 24 hours.

The amounts of a calix(n+m+1)arene of the above general formula (2) and a functional ingredient for use in the production of the functional resin additive composition of the present invention, may be determined in consideration of the aimed-at additive composition and thus not particularly limited. However, about 0.1 to 1,000 parts by weight of the functional ingredient may be suitably used relative to 100 parts by weight of the calix(n+m+1)arene of the above general formula (2), for example.

Moreover, in the case where two or more kinds of functional ingredients are planed to be incorporated, two or more kinds of functional ingredients may be used in the preparation of the solution or suspension (Y) of the functional ingredients.

By the above operations, the functional resin additive composition of the present invention can be produced.

Furthermore, the present invention also relates to a resin composition mixed with the above functional resin additive composition.

As such resins, there may be mentioned, e.g., thermoplastic resins including polyolefins such as polyethylene, polypropylene and the like, polystyrene, poly-p-xylylene, polyvinyl acetate, polyacrylates or polymethacrylates such as polymethyl methacrylate (PMMA) and the like, polyvinyl chloride (PVC), polyvinylidene chloride, fluorine-type plastics, polyacrylonitrile, polyvinyl ethers, polyvinyl ketones, polyethers, polycarbonates, polyamides, diene-type plastics, polyurethane-type plastics, acrylonitrile-butadiene-styrene copolymer (ABS), polyacetal, polyether ether ketone (PEEK), polyphenylene, polyphenylene oxide, polysulfones, silicones, natural-substance plastics such as cellulose-type plastics, protein-type plastics, and the like, etc.; thermosetting plastics including polyurethane resins, phenol resins, furan resins, xylene•formaldehyde resin, ketone•formaldehyde resins, urea resins, melamine resins, aniline resins, alkyd resins, unsaturated polyester resins, epoxy resins, triallylcyanurate resin, formaldehyde resin of tris(2-hydroxyethyl)isocyanurate, acrolein-type resins, phosphonitrile dihalide-type polymer derivatives, cured resins with dimaleimide, thermosetting resins from cyclopentadiene, crosslinking products by cyclic urea resins, triazine-type resins, etc.; and the like.

Additionally, as such resins, use may be made of various kinds of rubbers such as ethylene propylene rubber, chloroprene rubber and the like; crosslinked products obtainable by crosslinking polyethylene, polyvinyl acetate resin and the like with a peroxide or the like, mutual blends of the above thermoplastic resins, mutual blends of the above thermosetting resins, blends of thermoplastic resin(s) and thermosetting resin(s), and the like.

The resin may be suitably selected in view of physical properties and chemical properties required according to the application purpose.

The above functional resin additive composition of the present invention has a good affinity to organic polymers and thus is easily kneaded with an organic polymer, whereby a resin composition wherein the functional additive ingredient(s) are homogeneously dispersed, can be obtained. In particular, the advantage of the present invention gets obvious in the case where an additive ingredient is to be contained in a non-polar resin such as a polyolefin, PMMA, a polycarbonate, a polyamide, a polyacetal, ABS, PEEK, polystyrene or PVC.

The content of the resin additive composition in the resin composition is not particularly limited since it depends on the application purpose and the like of the resin composition. However, about 0.01 to 60 parts by weight of the resin additive composition may be suitably used relative to 100 parts by weight of the resin, for example.

Moreover, the resin compositions mixed with the resin additive composition of the present invention in various kinds of resins can be molded according to various application purposes by subjecting to per se known molding method such as thermal plasticizing treatment, thermal curing treatment, or the like.

BEST MODE FOR CARRYING OUT THE INVENTION

In the following will be described the present invention more specifically with reference to Examples, but the present invention is not limited thereto.

EXAMPLE 1

Resin Flame-retarding Additive Composition

A transparent solution (Solution A) was prepared by suspending 100 g of 4-tert-butylcalix(8)arene in a mixed solvent of 300 g of methanol and 700 g of acetone, and adding 12 g of KOH thereto, followed by stirring the whole mixture at room temperature. While a solution of 100 g of zinc sulfate as a flame retardant dissolved in 5,000 g of water was vigorously stirred, Solution A was added dropwise thereto, whereby a solid matter was precipitated. The precipitate was collected by filtration and dried by heating at 80° C. for 24 hours. The resulting dried powder was pulverized together with sodium chloride in a ball mill, and then the sodium chloride was removed by washing the pulverized powder with water. The washed powder was dried by heating at 80° C. for 24 hours to obtain an aimed-at powder composite (resin flame-retarding additive composition).

The resulting powder composite was hydrophobic. When 1 g of the powder was added into 10 mL of toluene, followed by stirring the whole mass, a well dispersed and stable dispersion was obtained. When 20 g of the powder and 100 g of polypropylene were mixed and transformed to strands with an extruder, the powder was well dispersed and a resin composition having a transparent appearance was obtained.

(Flame-retarding Effect)

A test piece was prepared by adding or incorporating 20 parts by weight of the above flame-retarding additive composition to or into 100 parts by weight of polypropylene. The test piece was subjected to a test in accordance with the UL flame resistance test standard. As a result, it was found that it exhibited a flame resistance of UL-94-V1 level.

Furthermore, another test piece was prepared by incorporating 20 parts by weight of the above flame-retarding additive composition and 5 parts by weight of silica ("VN-3" manufactured by Nippon Silica) into 100 parts by weight of polypropylene. The test piece was subjected to a test in accordance with the UL flame resistance test standard. As a result, it was found that it exhibited a flame resistance of UL-94-V0 level.

EXAMPLE 2

Resin Flame-retarding Additive Composition

A transparent solution (Solution B) was prepared by suspending 20 g of 4-tert-butylcalix(8)arene in a mixed solvent of 60 g of methanol and 140 g of acetone, and adding 2.4 g of KOH thereto, followed by stirring the whole mixture at room temperature. 100 g of colloidal aluminum hydroxide as a flame retardant was suspended in 5,000 g of water. While the suspension was stirred vigorously, Solution B was added dropwise thereto, whereby a solid matter was precipitated. The precipitate was collected by filtration and dried by heating at 80° C. for 24 hours. The resulting dried powder was pulverized together with sodium chloride in a ball mill and then the sodium chloride was removed by washing the pulverized powder with water. The washed powder was dried by heating at 80° C. for 24 hours to obtain an aimed-at powder composite.

When 1 g of the powder was added into 10 mL of toluene and the whole mass was stirred, a well dispersed and stable dispersion was obtained. When 25 g of the powder and 100 g of polypropylene were mixed and transformed to strands with an extruder, a resin composition wherein the powder was well dispersed was obtained.

(Flame-retarding Effect)

A test piece was prepared by incorporating 25 parts by weight of the above flame-retarding additive composition into 100 parts by weight of polypropylene. The test piece was subjected to a test in accordance with the UL flame resistance test standard. As a result, it was found that it exhibited a flame resistance of UL-94-V1 level.

EXAMPLE 3

Resin Flame-retarding Additive Composition

A transparent solution (Solution C) was prepared by suspending 10 g of 4-tert-butylcalix(8)arene in 200 g of acetone, and adding 6.2 g of triethylamine thereto, followed by stirring the whole mixture at room temperature. While a solution of 20 g of ammonium phosphate as a flame retardant for resin dissolved in 200 g of water was vigorously stirred, Solution C was added dropwise thereto, whereby a solid matter was precipitated. The precipitate was collected by filtration, washed with water, and dried by heating at 80° C. for 24 hours, whereby an aimed-at composite (resin flame-retarding additive composition) was obtained.

The obtained powder composite was hydrophobic. When 20 g of the powder and 100 g of polypropylene were mixed and transformed to strands with an extruder, the powder was well dispersed and a resin composition having a transparent appearance was obtained.

(Flame-retarding Effect)

A test piece was prepared by press-molding the above strands, and was subjected to a test in accordance with the UL flame resistance test standard. As a result, it was found that it exhibited a flame resistance of UL-94-V1 level.

Furthermore, another test piece was prepared by incorporating 20 parts by weight of the above flame-retarding additive composition and 5 parts by weight of silica ("VN-3" manufactured by Nippon Silica) into 100 parts by weight of polypropylene. The test piece was subjected to a test in accordance with the UL flame resistance test standard. As a result, it was found that it exhibited a flame resistance of UL-94-V0 level.

EXAMPLE 4

Resin Flame-retarding Additive Composition

A transparent solution (Solution D) was prepared by suspending 10 g of 4-tert-butylcalix(8)arene in 200 g of acetone, and adding 5 g of ethylenediamine thereto, followed by stirring the whole mixture at room temperature. While a solution of 20 g of phosphoric acid as a flame retardant for resin dissolved in 200 g of water was vigorously stirred, Solution D was added dropwise thereto, whereby a solid matter was precipitated. The precipitate was collected by filtration, washed with water, and dried by heating at 80° C. for 24 hours, whereby an aimed-at composite (resin flame-retarding additive composition) was obtained.

The resulting powder composite was hydrophobic. When 20 g of the powder and 100 g of polypropylene were mixed and transformed to strands with an extruder, the powder was well dispersed and a resin composition having a transparent appearance was obtained.

(Flame-retarding Effect)

A test piece was prepared by press-molding the above strands, and was subjected to a test in accordance with the UL flame resistance test standard. As a result, it was found that it exhibited a flame resistance of UL-94-V1 level.

Furthermore, another test piece was prepared by incorporating 20 parts by weight of the above flame-retarding additive composition and 5 parts by weight of silica ("VN-3" manufactured by Nippon Silica) into 100 parts by weight of polypropylene. The test piece was subjected to a test in accordance with the UL flame resistance test standard. As a result, it was found that it exhibited a flame resistance of UL-94-V0 level.

EXAMPLE 5

Resin Flame-retarding Additive Composition

A transparent solution (Solution E) was prepared by suspending 10 g of 4-tert-butylcalix(8)arene in 200 g of acetone, and adding 6.2 g of triethylamine thereto, followed by stirring the whole mixture at room temperature. While a solution of 20 g of pentaerythritol as a flame retardant for resin dissolved in 200 g of warm water was stirred vigorously, Solution E was added dropwise thereto, whereby a solid matter was precipitated. The precipitate was collected by filtration, washed with water and dried by heating at 80° C. for 24 hours, whereby an aimed-at composite (resin flame-retarding additive composition) was obtained.

The obtained powder composite was hydrophobic. When 20 g of the powder and 100 g of polypropylene were mixed and transformed to strands with an extruder, a resin composition wherein the powder was well dispersed and having a transparent appearance was obtained.

(Flame-retarding Effect)

A test piece was prepared by incorporating 5 parts by weight of the above composite and 20 parts by weight of the resin flame-retarding additive composition obtained in Example 5, into 100 parts by weight of polypropylene. The test piece was subjected to a test in accordance with the UL flame resistance test standard. As a result, it was found that it exhibited a flame resistance of UL-94-V0 level.

EXAMPLE 6

Resin Flame-retarding Additive Composition

A transparent solution (Solution F) was prepared by suspending 10 g of 4-tert-butylcalix(8)arene in 200 g of acetone, and adding 6.2 g of triethylamine thereto, followed by stirring the whole mixture at room temperature. While a solution of 20 g of ammonium sulphate as a flame retardant for resin dissolved in 200 g of water was stirred vigorously, Solution E was added dropwise thereto, whereby a solid matter was precipitated. The precipitate was collected by filtration, washed with water and dried by heating at 80° C. for 24 hours, whereby an aimed-at composite (resin flame-retarding additive composition) was obtained.

The obtained powder composite was hydrophobic. When 10 g of the powder and 100 g of polycarbonate were mixed and transformed to strands with an extruder, a resin composition wherein the powder was well dispersed and having a transparent appearance was obtained.

(Flame-retarding Effect)

A test piece was prepared by press-molding the above strands. This test piece was subjected to a test in accordance with the UL flame resistance test standard. As a result, it was found that it exhibited a flame resistance of UL-94-V0 level.

EXAMPLE 7

Resin Thermal Stabilizing Additive Composition

A transparent solution (Solution G) was prepared by suspending 10 g of 4-tert-butylcalix(8)arene in 200 g of acetone, and adding 6.2 g of triethylamine thereto, followed by stirring the whole mixture at room temperature. While a solution of 20 g of pentaerythritol as a thermal stabilizer dissolved in 200 g of warm water was stirred vigorously, Solution G was added dropwise thereto, whereby a solid matter was precipitated. The precipitate was collected by filtration, washed with water and dried by heating at 80° C. for 24 hours, whereby an aimed-at composite (resin thermal stabilizing additive composition) was obtained.

The obtained powder composite was hydrophobic. When 3 g of the powder was kneaded with 100 g of polyvinyl chloride and 50 g of dioctyl phthalate with a hot mill, a resin composition wherein the powder was well dispersed and having a transparent appearance was obtained.

(Thermal Stability Effect)

A sheet-shape molding was obtained by kneading 100 g of polyvinyl chloride, 50 g of dioctyl phthalate, 30 g of calcium carbonate, 0.8 g of calcium stearate, 2.2 g of zinc stearate, and 0.5 g of the powder obtained above, with a hot roll and then subjecting the resulting mixture to a press molding. When the sheet-shape molding was subjected to a heat resistance test at 180° C. in a gear oven, the time required for the color being changed to brown was found to be 150 minutes and thus the resin composition exhibited a good thermal stability.

EXAMPLE 8

Resin Curing Additive Composition

A transparent solution (Solution H) was prepared by suspending 100 g of 4-tert-butylcalix(8)arene in 700 g of acetone, adding 50 g of triethylamine as a resin-curing agent thereto, followed by stirring the whole mixture at room temperature. While solution H was vigorously stirred, 700 g of water was added dropwise thereto, whereby a solid matter was precipitated. The precipitate was collected by filtration and dried by heating at 80° C. for 24 hours. The dried powder was pulverized together with sodium chloride in a ball mill and then the sodium chloride was removed by washing the pulverized powder with water. The washed powder was dried by heating at 80° C. for 24 hours to obtain an aimed-at powder composite (resin curing additive composition).

The resulting powder composite was hydrophobic. When 1 g of the powder was added to 10 mL of toluene and the whole mass was stirred, a well-dispersed and stable dispersion was obtained. When 10 g of the powder and 100 g of a bisphenol A-type epoxy resin were mixed and the mixture was subjected to a heat treatment, first, at 50° C. for 6 hours and then at 100° C. for 2 hours, whereby a crosslinking reaction was caused, a resin composition wherein the powder was well dispersed and having a transparent appearance, was obtained.

(Pot Life)

When pot life (100° C.) of a mixture of 20 g of the powder composite obtained above and 100 g of a bisphenol A-type epoxy resin was measured, the above mixture started curing after 2 hours. Separately, the pot life (100° C.) of a mixture of 10 g of triethylamine and 100 g of the bisphenol A-type epoxy resin was measured, and the mixture started curing after 30 minutes.

The above Examples are examples of a novel functional resin additive composition of the present invention and a process for producing the same, and a resin composition mixed with the above resin additive composition. Other than these Examples, functional resin additive compositions can be produced using various functional ingredients depending on the purposes. Therefore, the above Examples are mere examples in all aspects, and should not be understood restrictively. Furthermore, all the changes or modifications belonging to an equivalent range of the claims fall within the scope of the present invention.

INDUSTRIAL APPLICABILITY

According to the present invention are provided a novel resin additive composition comprising various water-soluble or hydrophilic functional ingredient(s), and a process for producing the same. The additive composition shows as high a stability as engineering plastics. Moreover, the additive composition has a good affinity for organic polymers such as polyolefin and the like, which allows the functional ingredient(s) to be dispersed homogeneously in the resin. Therefore are provided high-performance resin compositions comprising various functional ingredient(s).

The invention claimed is:

1. A process for producing a resin additive composition, said composition comprising:

(a) a calix(n+m+λ)arene of formula (2):

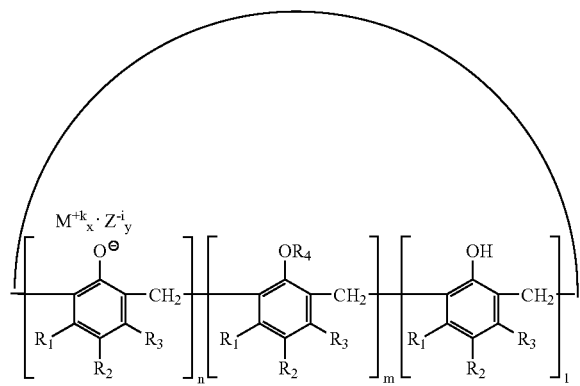

(2)

wherein $R_1$, $R_2$ and $R_3$ each independently represent a hydrogen atom, a saturated or unsaturated alkyl group which may have one or more substituents, an aryl group which may have one or more substituents, an alkoxyl group which may have one or more substituents, a halogen atom, a nitro group, an acyl group, a carboxyl group, a sulfonic acid group, or an amino group which may have one or more substitaents; $R_4$ represents a saturated or unsaturated alkyl group which may have one or more substituents, an aryl group which may have one or more substituents, or an anyl group; n represents an integer of 1 to 10; m represents an integer of 0 to 10; l represents an integer of 0 to 10, and n+m+l represents an integer of 4 to 10; $R_1$, $R_2$ and $R_3$ may be different from each other depending on each unit of n, m and l; $M^{+k}$ represents a metal ion, an $NH_4^+$ ion, or an organic cation; +k represents the valence number of the ion; k represents an integer of 1 to 6; $Z^{-i}$ represents an anion; −i represents the valence number of the anion; i represents an integer of 1 to 6; x represents an integer of 1 to 10; and y represents an integer of 0 to 10, such that the equation:

$x \times k = i \times y + n$ is satisfied; and (b) a functional ingredient which is at least one member selected from the group consisting of a resin flame-retardant, a resin thermal stabilizer, and a resin curing agent, said process comprising precipitating said calix(n+m+l)arene and said functional ingredient together, from a solution of the calix(n+m+l)arene and a solution or suspension of the functional ingredient, such that said functional ingredient is dispersed homogeneously in the solid calix(n+m+l)arene to form a composite composition.

2. The process of claim 1, which comprises blending a solution or suspension of said functional ingredient in a solvent comprising water and/or an alcohol or a solvent capable of mixing therewith and a solution of said calyx(n+m+l)arene in a solvent comprising an alcohol, to obtain a precipitate, and separating said precipitate.

3. The process of claim 2, which comprises adding dropwise a solution of said calyx(n+m+l)arene in a solvent comprising an alcohol with stirring to a solution or suspension of said functional ingredient in a solvent comprising water, to obtain a precipitate, and separating said precipitate.

4. The process of claim 3, wherein after said precipitate has been obtained, said solvent thereof is neutralized with an acid before said precipitate is separated.

5. The process of claim 3, which comprises blending a solution or suspension of said functional ingredient in a solvent comprising an alcohol and a solution of said calyx (n+m+l)arene in a solvent comprising an alcohol, to obtained a mixture, neutralizing said mixture with an acid, to obtain a precipitate, and separating and drying said precipitate.

6. The process of claim 3, which comprises blending a solution or suspension of said functional ingredient in a solvent comprising an alcohol and a solution of said calix (n+m+l)arene in a solvent comprising an alcohol, to obtain a mixture, followed by adding to said mixture an organic poor solvent miscible with water and/or an alcohol, or water, to obtain a precipitate, and separating and drying said precipitate.

7. The process of claim 4, wherein after said precipitate has been obtained, said solvent thereof is neutralized with an acid, and then said precipitate is separated.

8. The process of claim 3, which comprises blending a solution or suspension of said functional ingredient in a solvent comprising an alcohol and a solution of said calix (n+m+l)arene in a solvent containing an alcohol, to obtain a mixture, evaporating solvent from said mixture, to obtain a precipitate, and separating and drying said precipitate.

9. The process of claim 8, wherein after said precipitate has been obtained, said solvent thereof is neutralized with an acid, and then said precipitate is separated.

10. The process of claim 3, which comprises adding dropwise with stirring a solution of said calyx(n+m+l)arene in a solvent comprising an alcohol to a solution or suspension of said functional ingredient in a solvent miscible with an alcohol, to obtain a precipitate, and filtering and separating said precipitate.

11. A resin additive composition, which is obtain by the process of claim 1, and wherein said functional ingredient is dispersed homogeneously in a solid of said calix(n+m+l)arene in the form of particles smaller than 1 μm.

12. The composition of claim 11, wherein m is 0; n+m+l represents 4, 6, or 8; and $R_1$ and $R_3$ each represent a hydrogen atom; and $R_2$ represents a saturated or unsaturated alkyl group which may have one or more substituents or an aryl group which may have one or more substituents.

13. The composition of claim 11, wherein m is an integer of 1 or more; n+m+l represents 4, 6, or 8; $R_1$ and $R_3$ each represent a hydrogen atom; and $R_2$ represents a saturated or unsaturated alkyl group which may have one or more substituents or an aryl group which may have one or more substituents.

14. The composition of claim 11, wherein $M^{+k}$ represents an alkali metal ion, an $NH_4^+$ ion, or an organic ammonium ion.

15. The composition of claim 14, wherein m is 0; and n+m+l represents 4, 6, or 8; $R_1$ and $R_3$ each represent a hydrogen atom; and $R_2$ represents a saturated or unsaturated alkyl group which may have one or more substituents or an aryl group which may have one or more substituents.

16. The composition of claim 14, wherein m is an integer of 1 or more; n+m+l represents 4, 6, or 8; $R_1$ and $R_3$ each represent a hydrogen atom; and $R_2$ represents a saturated or unsaturated alkyl group which may have one or more substituents or an aryl group which may have one or more substituents.

17. The composition of claim 11, wherein said functional ingredient is held between molecules of said calix(n+m+l)arene.

18. A resin composition, in which a resin additive composition of claim 11 has been incorporated.

19. The resin composition of claim 18, which has been subjected to a thermal plasticizing treatment or a thermal curing treatment.

* * * * *